(12) United States Patent
Hanks

(10) Patent No.: US 9,203,638 B2
(45) Date of Patent: Dec. 1, 2015

(54) CMTS PLANT TOPOLOGY FAULT MANAGEMENT

(75) Inventor: William T Hanks, Carol Stream, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 891 days.

(21) Appl. No.: 12/416,955

(22) Filed: Apr. 2, 2009

(65) Prior Publication Data

US 2010/0254283 A1 Oct. 7, 2010

Related U.S. Application Data

(60) Provisional application No. 61/113,582, filed on Nov. 11, 2008.

(51) Int. Cl.
| | |
|---|---|
| H04L 12/28 | (2006.01) |
| H04L 12/54 | (2013.01) |
| H04N 7/10 | (2006.01) |
| H04N 7/22 | (2006.01) |
| H04N 21/21 | (2011.01) |
| H04N 21/23 | (2011.01) |
| H04N 21/61 | (2011.01) |
| H04N 21/647 | (2011.01) |
| H04L 12/24 | (2006.01) |

(52) U.S. Cl.
CPC .......... *H04L 12/2801* (2013.01); *H04L 12/287* (2013.01); *H04L 12/2861* (2013.01); *H04L 12/5695* (2013.01); *H04L 41/509* (2013.01); *H04L 41/5009* (2013.01); *H04N 7/10* (2013.01); *H04N 7/22* (2013.01); *H04N 21/21* (2013.01); *H04N 21/23* (2013.01); *H04N 21/6118* (2013.01); *H04N 21/64723* (2013.01); *H04N 21/64746* (2013.01); *H04L 41/0213* (2013.01)

(58) Field of Classification Search
None
See application file for complete search history.

(56) References Cited

U.S. PATENT DOCUMENTS

| | | | | |
|---|---|---|---|---|
| 6,433,905 | B1 * | 8/2002 | Price et al. | 725/129 |
| 6,707,829 | B1 * | 3/2004 | Hanks et al. | 370/519 |
| 6,917,614 | B1 * | 7/2005 | Laubach et al. | 370/392 |
| 7,058,007 | B1 * | 6/2006 | Daruwalla et al. | 370/432 |
| 7,065,779 | B1 * | 6/2006 | Crocker et al. | 725/111 |
| 7,149,223 | B2 * | 12/2006 | Liva et al. | 370/401 |
| 7,197,052 | B1 * | 3/2007 | Crocker | 370/474 |
| 7,349,430 | B1 * | 3/2008 | Chapman | 370/432 |
| 7,548,548 | B2 * | 6/2009 | Rakib et al. | 370/419 |
| 7,574,345 | B2 * | 8/2009 | West et al. | 370/466 |
| 7,701,951 | B2 * | 4/2010 | Chapman et al. | 370/395.52 |
| 2003/0126255 | A1 * | 7/2003 | Rice et al. | 709/224 |
| 2003/0126256 | A1 * | 7/2003 | Cruickshank et al. | 709/224 |
| 2003/0195922 | A1 * | 10/2003 | Andrews et al. | 709/202 |
| 2003/0202534 | A1 * | 10/2003 | Cloonan | 370/468 |
| 2004/0111753 | A1 * | 6/2004 | Hoang | 725/111 |
| 2004/0163129 | A1 * | 8/2004 | Chapman et al. | 725/126 |
| 2004/0261119 | A1 * | 12/2004 | Williams et al. | 725/129 |
| 2005/0025145 | A1 * | 2/2005 | Rakib et al. | 370/389 |
| 2005/0265338 | A1 * | 12/2005 | Chapman et al. | 370/389 |
| 2006/0117363 | A1 * | 6/2006 | Lee et al. | 725/106 |
| 2006/0251097 | A1 * | 11/2006 | Chapman et al. | 370/431 |
| 2007/0081560 | A1 * | 4/2007 | Walston et al. | 370/509 |

(Continued)

*Primary Examiner* — Chirag Shah
*Assistant Examiner* — Joshua Smith
(74) *Attorney, Agent, or Firm* — Troy A. Van Aacken

(57) ABSTRACT

A cable television plant may include fiber nodes, cable modems, a management information base (MIB), and a cable modem termination system (CMTS). The CMTS may include logic to apply information from the MIB to determine the suitability of resources assigned to the fiber nodes from particular MAC domains for providing data communications.

4 Claims, 4 Drawing Sheets

(56) References Cited

U.S. PATENT DOCUMENTS

| | | | |
|---|---|---|---|
| 2007/0150927 A1* | 6/2007 | Chapman | 725/111 |
| 2007/0180142 A1* | 8/2007 | Small et al. | 709/245 |
| 2007/0204312 A1* | 8/2007 | Wheelock | 725/94 |
| 2007/0239391 A1* | 10/2007 | West et al. | 702/122 |
| 2008/0126540 A1* | 5/2008 | Zeng et al. | 709/225 |
| 2008/0273548 A1* | 11/2008 | Leano et al. | 370/442 |
| 2010/0040055 A1* | 2/2010 | Ford et al. | 370/389 |
| 2010/0223650 A1* | 9/2010 | Millet et al. | 370/242 |

* cited by examiner

CMTS PLANT TOPOLOGY FAULT MANAGEMENT

PRIORITY CLAIM

This application claims priority under 35 U.S.C. 119 to USA provisional application Ser. No. 61/113,582 filed on Nov. 11, 2008.

TECHNICAL FIELD

The present disclosure relates to hybrid fiber coax (HFC) plant topology fault management.

BACKGROUND

Multiple cable modems may send and receive information over the same physical channels in both the upstream and downstream directions in a cable plant. This creates issues related to quality of service (QoS), timing, and bandwidth allocation. A cable modem termination system (CMTS) may include one or more processes each called a media access control (MAC) domain, which manages groups of channels and their associated modems. MAC domains may be provisioned by the cable plant operator. In a typical configuration, each cable modem in a particular MAC domain receives downstream provisioning information from one downstream channel. All of these cable modems arbitrate for shared access to the same logical upstream channel(s) in the MAC domain, according to information such as MAC bandwidth allocation MAP messages provided by the CMTS. MAP information is provided continuously from the CMTS on the downstream channel.

The DOCSIS 3.0 standard has been proposed for standardizing the communication of data in cable plant communication systems. One thing that DOCSIS 3.0 specifies is the relationship of downstream and upstream channels. This information may be provisioned into a database, called the DOCSIS 3.0 simple network management protocol (SNMP) management information base (MIB). Information from this database may be applied by the CMTS to set up upstream and downstream channels to associate MAC domains and cable modems associated with each fiber node in the system. These associations of channels are known as MAC domain cable modem service groups (MD-CM-SG).

Cable modems typically range and register with the CMTS when the cable modem is booted. The CMTS assigns the cable modem logical upstream channel assignments and MAPS which indicate the timing of upstream messages for the cable modem. The provisioning tells the CMTS which groups of logical upstream channels are available for this cable modem. Cable modems may be further restricted to certain upstream/downstream channels because of their physical limitations.

FIG. 1 shows a hierarchy of the organization of MAC domains, cable modem service groups, and channels by a cable modem termination system. The cable modem termination system (CMTS) 102 may manage multiple MAC domains 104-106. Each MAC domain in turn may comprise multiple MAC domain cable modem service groups. Domain 105 comprises service groups 108-110. Each cable modem service group may comprise logical upstream channels and downstream channels that are associated with one another for the purposes of ranging, registering and providing service to a cable modem system subscribers. For example service group 109 comprises downstream channels 112-114 and physical upstream channels 116-117. Each physical upstream channel may comprise one or more logical upstream channels with different characteristics, which are shared on the physical channel in a time-division fashion. For example, physical upstream channel 117 comprises logical upstream channels 118-119.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Figure 1:
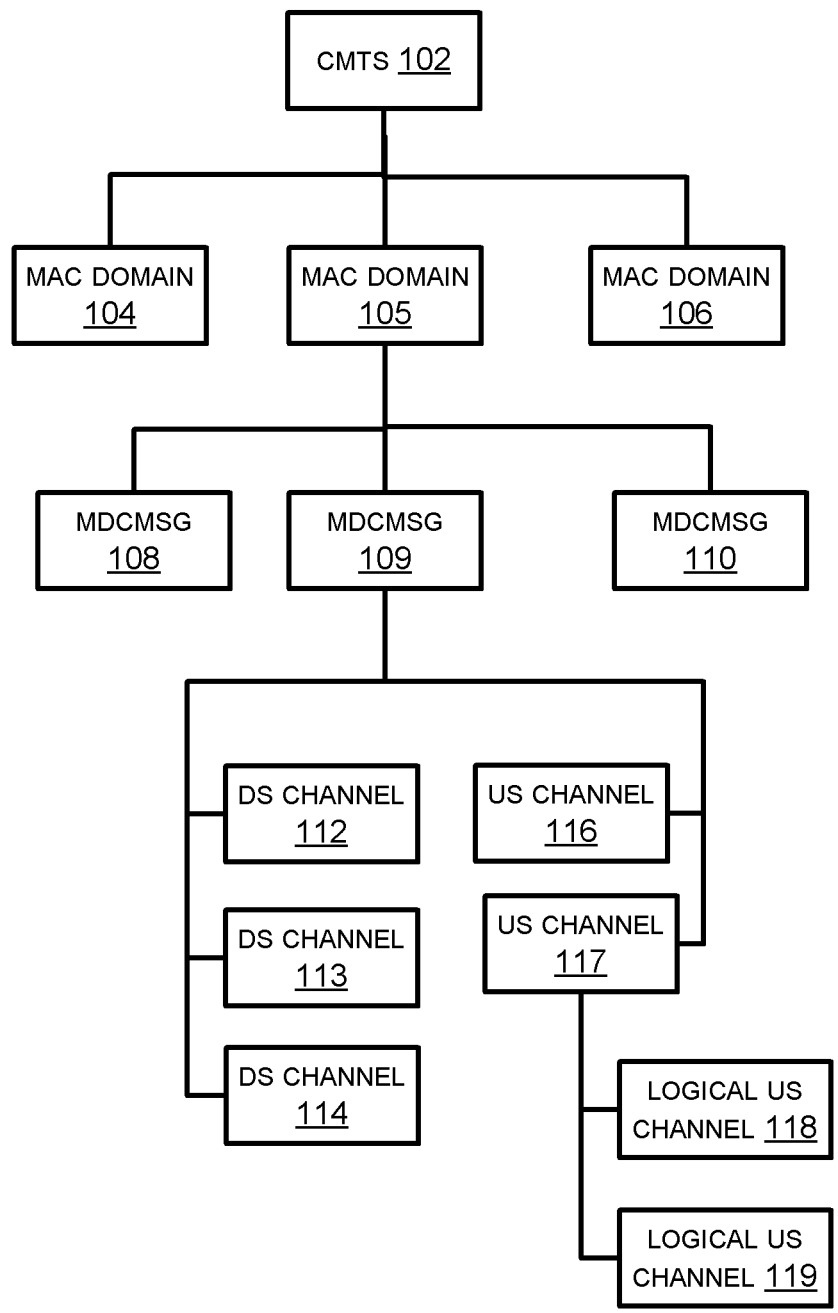
FIG. 1 illustrates an embodiment of a hierarchy of the organization of MAC domains, cable modem service groups, and channels by a cable modem termination system.
Figure 2:
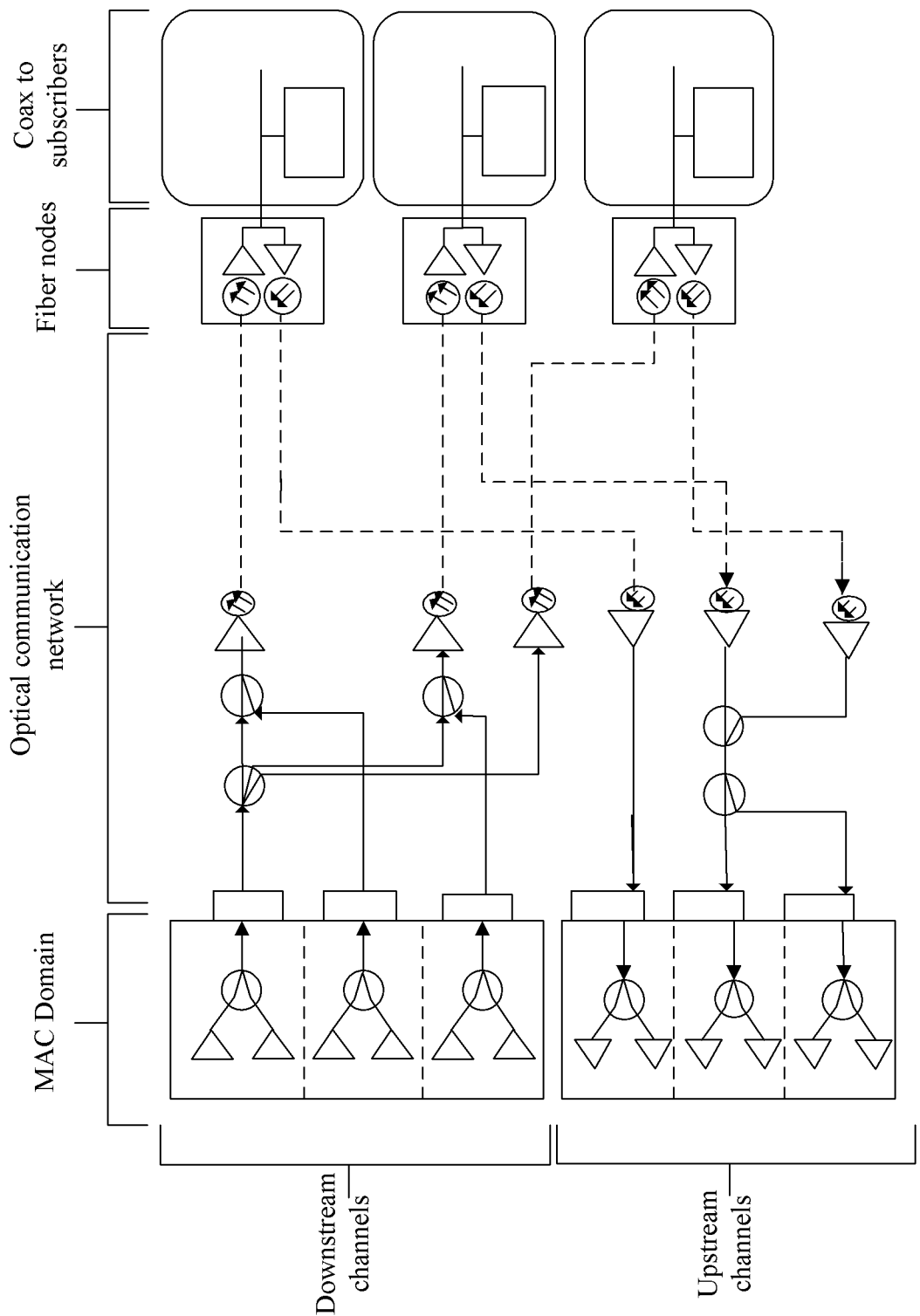
FIG. 2 illustrates a MAC domain embodiment in an exemplary hybrid fiber coax communication system.

FIG. 2 shows a MAC domain embodiment in an exemplary hybrid fiber coax communication system. A hybrid fiber coax (HFC) communication system comprises both optical and electrical communication technologies. Such a system may include fiber optics for communicating optical information and coaxial cable for communicating electrical information, typically in the radio frequency (RF) range. HFC communication systems are commonly employed in the cable television industry. HFC communication systems are typically used to communicate not only audio and visual information for display and rendering with televisions, but also data, such as internet, voice over IP, file transfers, gaming and so on, using for example internet protocol (IP).

DOCSIS 3.0 simple network management protocol (SNMP) management information base (MIB) provides for the provisioning of channel information into a cable television (CATV) network. However, DOCSIS 3.0 does not define a method of calculating or indicating a degree to which resources that are assigned to a topological entity (such as a fiber node) from a particular MAC domain may be used to provide service, e.g. data communications.

DOCSIS 3.0 allows some degree of channel configuration flexibility. In the downstream direction, the channel may be configured to (1) provide critical DOCSIS timing information to cable modems, or (2) not provide this timing information. A downstream channel configured to provide this timing information is said to be 'primary capable'. A downstream channel under DOCSIS 3.0 may be provisioned to provide access supervision information for a logical upstream channel. This access supervision information may comprise bandwidth allocation MAPs and upstream channel descriptors (UCDs). An operator may provision any channel to be assigned to any fiber node in the system. The only requirement is that there is an actual physical connection available between the channel's assigned port at the CMTS and the fiber node. The access supervision information which is provided by a downstream channel provisioned for that purpose may be applied by a cable modem of a cable system subscriber in order to range, register, and provide service to the subscriber.

Described herein are embodiments of procedures, devices (e.g. a CMTS), and systems to track the operational status of cable plant topology entities, such as fiber nodes. In one embodiment, a CMTS maintains information about the operational status of each (MAC domain, fiber node) pair for which provisioning information is available. The CMTS may maintain information to verify that each (fiber node, MAC domain) pair meets minimum requirements to provide service at a fiber node. Minimum requirements for MAC domain service at a fiber node may include:

at least one active and properly functioning downstream channel from the MAC domain is assigned and coupled to the fiber node.

(2) at least one of the MAC domain's active downstream channels to the fiber node is primary capable.

(3) at least one active and properly functioning physical upstream channel with at least one active and properly functioning logical upstream channel associated with the MAC domain is assigned and coupled to the fiber node.

(4) access supervision information for the logical upstream channels is carried on at least one of the active downstream channels assigned to the fiber node. Channel access supervision information for multiple logical upstream channels may or may not be carried on the same downstream channel.

The operational status information from (a MAC domain, fiber node) pair may be applied for a number of purposes, including:

Communicating notifications to management devices as the state changes for the affected fiber node.

When a particular MAC domain cable modem service group experiences a fault, the operational state information may be applied to prevent an avalanche of state change notifications from cable modems at the affected fiber node. In this scenario, CMTS may identify the failed MD-CM-SG as the cause of multiple instances of a loss of communications with CMs that rely upon the MD-CM-SG operation and choose to only communicate the root cause rather than all of the symptoms.

The CMTS or some other system device(s) may display the operational status of each fiber node being served by the MAC domain, as an aid in trouble shooting configuration problems or for architecture verification.

Figure 3:
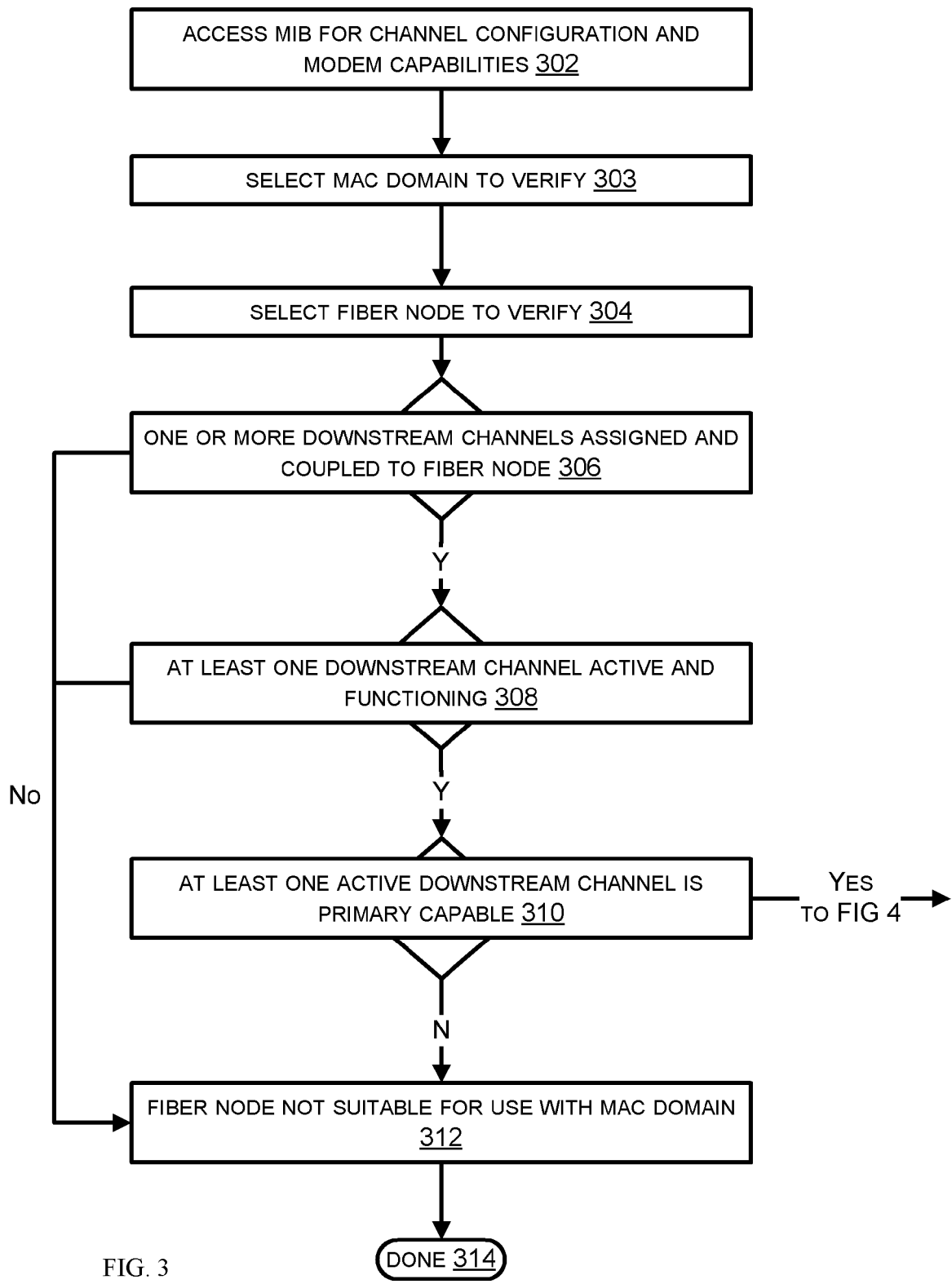
FIGS. 3 and 4 are flow charts of an embodiment of a fault management process by a CMTS.
Figure 4:
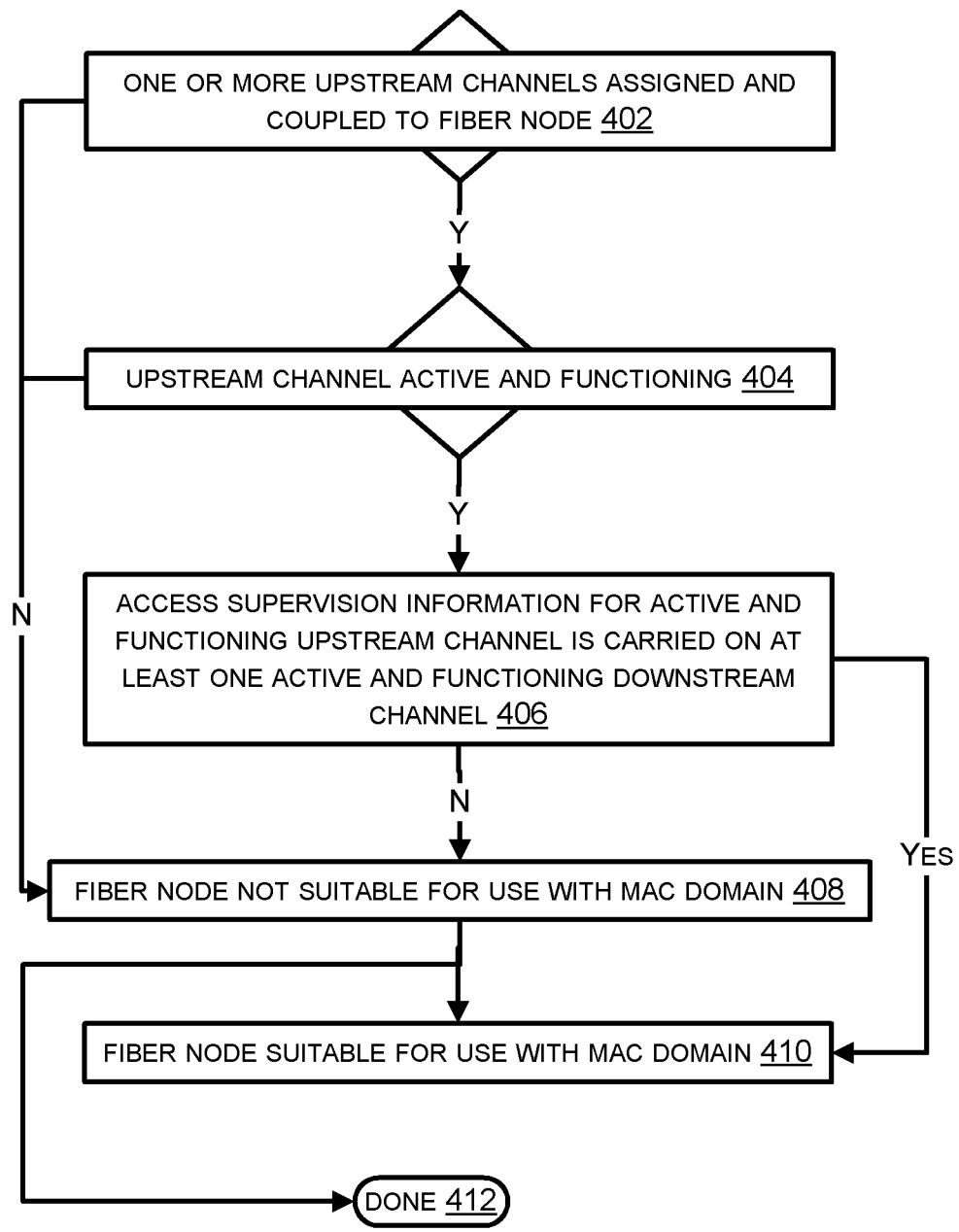

FIGS. 3 and 4 are flow charts of an embodiment of a fault management process by a CMTS. The CMTS accesses the management information base (MIB) for DOCSIS provisioning information (302). A MAC domain and fiber node to verify are selected (303, 304). If one or more active and functioning downstream channels are assigned to the fiber node, and at least one of these is primary capable (306-310), the CMTS proceeds to verify the upstream channel situation for the fiber node. Otherwise, the fiber node is not suitable for data communications use with the MAC domain (312) and the process concludes (314).

Verification continues by determining that one or more upstream channels are assigned and coupled to the fiber node (402). The logical upstream channel should be active and functioning (404) and access supervision for the upstream channel should be carried on at least one active and functioning downstream channel (406). If these conditions are not present, the fiber node is not suitable for use with data communications with the MAC domain (408). If these conditions are met (as well as the downstream channel conditions), the fiber node/MAC domain combination is suitable for use with data communications to and from downstream modems (410). At 412 the process concludes Some cable modems may have limited flexibility in terms of channel spacing modulation or other communication characteristics, especially in regards to downstream channel support. DOCSIS 3.0 provides a mechanism by which cable modems can report their receiver architecture, e.g. downstream channel support, to the CMTS during service registration. The CMTS may identify if there are one or more cable modems which are not fully compatible with the downstream and upstream capabilities as configured into the DOCSIS 3.0 database. The CMTS may verify the general requirements for service from each MAC domain to associated fiber nodes. In some implementations, the CMTS may verify or report the degree of suitability of each MAC domain and/or fiber node, and/or combinations thereof, for supporting each connected cable modem, and/or each potential cable modem architecture that may be serviced by that fiber node. For example, a particular cable modem may have a limited receiver band of 60 MHz. Four downstream channels, evenly spaced in an 80 MHz band, could not all be received by this model of cable modem. One solution would be to assign and track a suitability value to each (MAC domain, fiber node) pair for a particular cable modem architecture. This value could be used to assist the cable plant operator to select cable modems to provide the desired services. Alternatively, this information could be used as feedback to an operator that some of the subscriber cable modems may be forced into a less than optimal (i.e. impaired) usability state based upon the current system configuration.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A cable modem termination system comprising:
    machine memory and/or circuits comprising logic to maintain an operational status indicating whether each of a plurality of fiber nodes coupled to the cable modem termination system is operationally capable of providing service to cable modems over each of a plurality of MAC domains, wherein each MAC domain communicates with a plurality of fiber nodes over a plurality of downstream channels and a plurality of upstream channels, at least one downstream channel from each MAC domain coupled to carry data from the MAC domain to a first plurality of the fiber nodes, at least one upstream channel to each MAC domain coupled to carry data from a second plurality of the fiber nodes to the MAC domain, the CMTS maintaining the operational status separately for each unique pair of MAC domain and fiber node, the operational status including which downstream channels and which upstream channels are active and properly functioning between each unique pair of MAC domain and fiber node, which downstream channels and which upstream channels have a respective fault, and a respective state of each fiber node; and
    machine memory and/or circuits comprising logic to formulate a minimum requirement for identifying each unique pair of MAC domain and fiber node as operationally capable of providing service to the cable modems, and logic to generate, from a DOCSIS MIB, a suitability metric for a particular cable modem architecture to a particular fiber node, the minimum requirement comprising:
        at least one active and properly functioning downstream channel from each MAC domain is assigned and coupled to a corresponding fiber node of the unique pair;
        at least one of the MAC domain's active downstream channels to the corresponding fiber node is primary capable;
        at least one active and properly functioning physical upstream channel with at least one active and properly functioning logical upstream channel associated with the MAC domain is assigned and coupled to the corresponding fiber node; and access supervision information for the logical upstream channels is carried on at least one of the active downstream channels assigned to the corresponding fiber node.

2. The cable modem termination system of claim 1, further comprising: machine memory and/or circuits comprising logic to act to prevent a state change notification avalanche from cable modems coupled to a fiber node when a MAC domain for the fiber node is not verified as suitable.

3. A cable television plant comprising fiber nodes, cable modems, a management information base (MIB), and a cable modem termination system (CMTS), the CMTS comprising machine memory and/or circuits comprising logic to apply information from the MIB to determine a suitability for providing data communications of resources assigned to the fiber nodes from particular MAC domains, wherein each MAC domain communicates with the fiber nodes over a plurality of downstream channels and a plurality of upstream channels, at least one downstream channel from each MAC domain coupled to carry data from the MAC domain to a first plurality of the fiber nodes, at least one upstream channel to each MAC domain coupled to carry data from a second plurality of the fiber nodes to the MAC domain, the CMTS maintaining the operational status separately for each unique pair of MAC domain and fiber node, the operational status including which downstream channels and which upstream channels are active and properly functioning between each unique pair of MAC domain and fiber node, which downstream channels and which upstream channels have a respective fault, and a respective state of each fiber node; and the CMTS further comprising machine memory and/or circuits comprising logic to formulate a minimum requirement for identifying each unique pair of MAC domain and fiber node as operationally capable of providing service to the cable modems, and logic to generate, from the DOCSIS MIB, a suitability metric for a particular cable modem architecture to a particular fiber node, the minimum requirement comprising:

at least one active and properly functioning downstream channel from each MAC domain is assigned and coupled to a corresponding fiber node of the unique pair;

at least one of the MAC domain's active downstream channels to the corresponding fiber node is primary capable;

at least one active and properly functioning physical upstream channel with at least one active and properly functioning logical upstream channel associated with the MAC domain is assigned and coupled to the corresponding fiber node; and access supervision information for the logical upstream channels is carried on at least one of the active downstream channels assigned to the corresponding fiber node.

4. The cable television plant of claim 3, the CMTS further comprising: machine memory and/or circuits comprising logic to act to prevent a state change notification avalanche from cable modems coupled to a particular fiber node when a MAC domain changes to an unsuitable state.

* * * * *